(12) United States Patent
Sakai et al.

(10) Patent No.: US 8,700,099 B2
(45) Date of Patent: Apr. 15, 2014

(54) HINGE UNIT AND PORTABLE TERMINAL

(75) Inventors: Takahiro Sakai, Tokyo (JP); Toshiki Yamanaka, Shizuoka (JP)

(73) Assignee: NEC Corporation, Tokyo (JP)

(*) Notice: Subject to any disclaimer, the term of this patent is extended or adjusted under 35 U.S.C. 154(b) by 3 days.

(21) Appl. No.: 13/503,550

(22) PCT Filed: Oct. 18, 2010

(86) PCT No.: PCT/JP2010/068294
§ 371 (c)(1),
(2), (4) Date: Apr. 23, 2012

(87) PCT Pub. No.: WO2011/049050
PCT Pub. Date: Apr. 28, 2011

(65) Prior Publication Data
US 2012/0208603 A1 Aug. 16, 2012

(30) Foreign Application Priority Data
Oct. 21, 2009 (JP) .................................. 2009-242664

(51) Int. Cl.
H04B 1/38 (2006.01)
(52) U.S. Cl.
USPC ...... 455/566; 455/90.1; 455/90.3; 455/575.3; 455/575.4; 455/90.2; 379/433.11
(58) Field of Classification Search
USPC ........ 455/566, 90.1, 575.3, 90.3, 575.4, 90.2; 361/680; 379/433.11
See application file for complete search history.

(56) References Cited

U.S. PATENT DOCUMENTS

| 7,151,911 B2* | 12/2006 | Matsumoto | 455/90.2 |
| 7,187,957 B2* | 3/2007 | Kato | 455/575.3 |
| 7,986,985 B2* | 7/2011 | Niitsu et al. | 455/575.4 |
| 2006/0135228 A1 | 6/2006 | Kato | |
| 2007/0004475 A1* | 1/2007 | Kuo et al. | 455/575.3 |
| 2007/0146977 A1* | 6/2007 | Choi | 361/680 |

FOREIGN PATENT DOCUMENTS

| CN | 1469668 | 1/2004 |
| CN | 1543170 | 11/2004 |
| JP | 2004-328279 | 11/2004 |
| JP | 2007-043479 | 2/2007 |
| JP | 2007-208149 | 8/2007 |
| JP | 2008-278220 | 11/2008 |

OTHER PUBLICATIONS

International Search Report, PCT/JP2010/068294, Nov. 16, 2010.
Chinese Official Action—2010800479016—Dec. 3, 2013.

* cited by examiner

*Primary Examiner* — Sanh Phu
(74) *Attorney, Agent, or Firm* — Young & Thompson

(57) ABSTRACT

There are provided a hinge unit and portable terminal, even when a display housing is inverted to respond to demands for thin and light weight structure and high design quality, its display housing is always in a proper position. The display housing 1 has a display device 2 at its display housing front 1*a*. The display device 2 is made up of, for example, a liquid crystal display device and performs predetermined displaying. The shaft fitting section 3 is fitted in an end terminal region of one side of the display housing. A shaft 4 is inserted into the shaft fitting section 3 to support the display housing 1 in a manner to be freely inverted and fitted to the shaft fitting section 3 so that an axial center of the inverting axis forms a predetermined angle with a display surface of the display device 2.

2 Claims, 8 Drawing Sheets

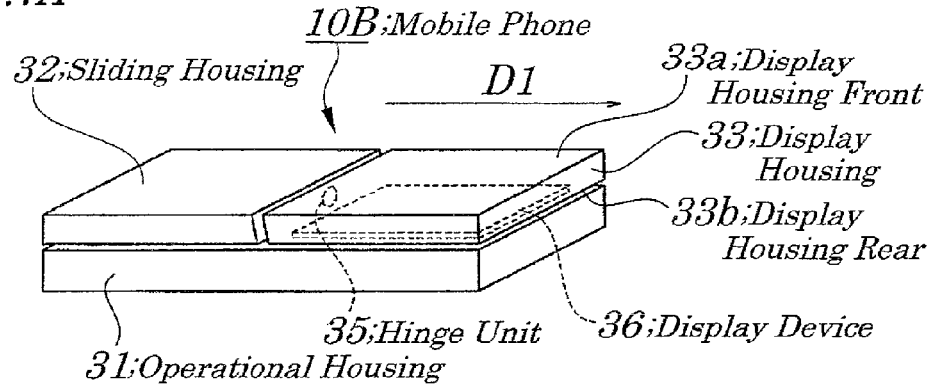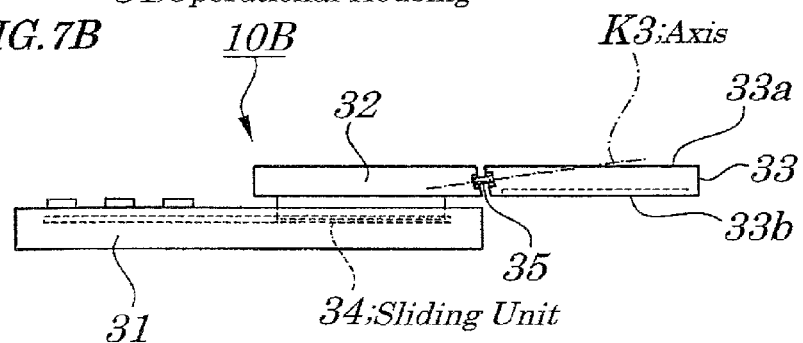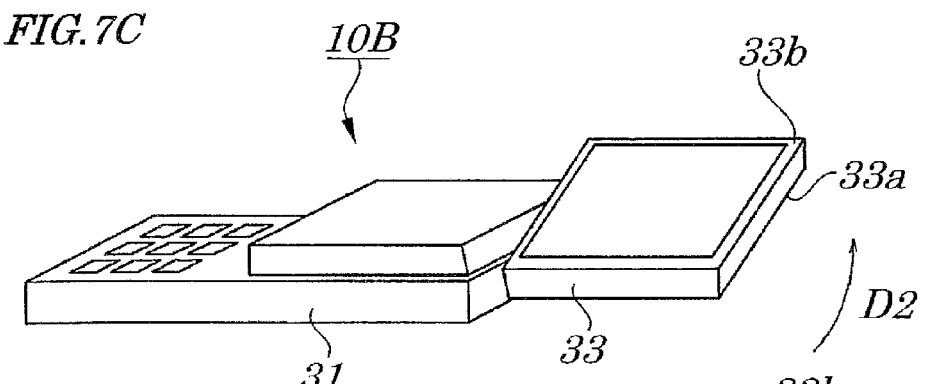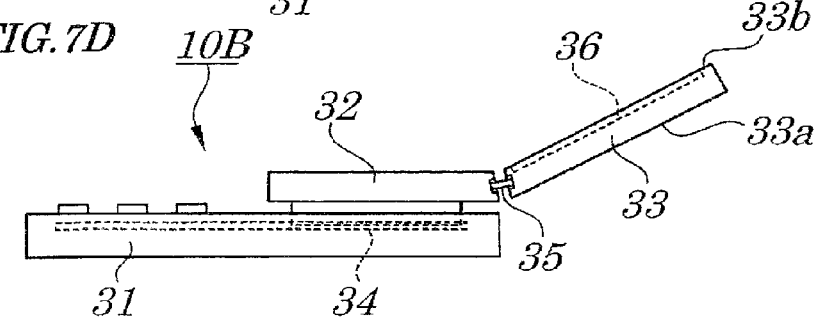

HINGE UNIT AND PORTABLE TERMINAL

TECHNICAL FIELD

The present invention relates to a hinge unit and a portable terminal and, more particularly, to the hinge unit and the portable terminal that can be suitably used in the case where a display housing having a display device and an operational housing having an operational surface are connected to each other through the hinge unit so as to be freely foldable even when the display device is directed inwards or outwards.

BACKGROUND TECHNOLOGY

In a portable terminal such as a mobile phone, a product being excellent in not only thin and light weight structure but also rich in functionality is demanded in recent years. For example, the portable electronic device stated in Patent Reference 1 includes a first housing, a second housing with a display device on its front side, and a two-axial type hinge having two rotational shaft in a position being twisted to each other. Thus, by enabling the second housing to be rotationally moved in two directions, forms of applications of the portable terminal can be increased.

Moreover, as a portable terminal product, a product being rich in designing quality is demanded. For example, as shown in FIGS. 9A and 9B, in the foldable portable terminal device 100, by causing its housing 102 (hereinafter, may be referred to as a display housing) having a display device 101 to be thinner towards its end side, its design quality is enhanced. The portable terminal device 100 is made up of an operational housing 103, a display housing 102, and a hinge unit 104. The hinge unit 104 is constructed as a two-axial mechanism and the display housing 102 rotationally moves around the opening and closing axis Y along the width direction of the portable terminal device 100 and rotationally moves around the inverting axis X forward and backward along the longitudinal direction of the display housing 102.

By rotating the display housing 102 around the inverting axis X, as shown in FIG. 9A, there occurs a display inward directing state in which the portable terminal device 100 is closed and, as shown in FIG. 9B, there occurs a display outward state directing state in which the portable terminal device 100 is closed. Moreover, the display inward directing state represents the state in which a display housing front 102a forming a same surface as the display surface of the display device 101 faces the operational housing 103. The display outward directing state represents the state in which a display housing rear 102b on a rear side of the display housing front 102a faces the operational housing 103.

RELATED ART DOCUMENT

Related Art Patent Reference

Related Art Patent Reference 1: Japanese Patent Application Laid-open No. 2007-208149.

SUMMARY OF INVENTION

Problems to be Solved by the Invention

However, the above related arts have the following problems. As is apparent when FIG. 9A is compared with FIG. 9B, a difference occurs in clearance between the display housing 102 and the operational housing 103 in the display inward directing state and display outward directing state, which produces a problem that the display surface of the display device 101 is easily injured. On the other hand, in recent years, the portable terminal device 100 is becoming thinner in response to demands for thin and light weight structure. Moreover, in order to enhance the design quality, the thickness of the display housing 102 is so designed as to be changed. In the display housing 102 having such a shape, rigidity of the display housing becomes small and is easily deformed (bent) by external force. Due to this deformation, the display housing 102 easily contacts with the operational housing 103 thus causing the display housing 102 to be injured. Especially, the contact between the display housing 102 and the operational housing 103 easily occurs in a portion where the clearance is small. This problem rises due to reasons that, when the portable terminal is closed, the inverting axis X supporting the display housing in a manner to be freely inverted is formed in parallel to the display housing front or display housing rear.

In view of the above, it is an object of the present invention to provide a hinge unit and portable terminal wherein, even when a display housing is inverted to respond to demands for thin and light weight structure and high design quality, its display housing is always in a proper position.

Means for Solving the Problems

In order to solve the above problems, according to a first feature configuration of the present invention, there is provided a hinge unit comprising, a shaft fitting section to be fitted to an end terminal region of one side of a display housing having a display device; and a shaft inserted into the shaft fitting section to support the display housing in a manner to be freely inverted about an inverting axis and fitted to the shaft fitting section so that an axial center of the inverting axis forms a predetermined angle with a display surface of the display device.

According to a second feature configuration of the present invention, there is provided a portable terminal comprising a display housing with a display device, an operational housing with an operational surface, and a hinge unit to connect the display housing and the operational housing, wherein the hinge unit has a shaft fitting section to be fitted to an end terminal region of one side of a display housing having a display device and a shaft inserted into the shaft fitting section to support the display housing in a manner to be freely inverted about an inverting axis and fitted to the shaft fitting section so that an axial center of the inverting axis forms a predetermined angle with a display surface of the display device.

Effects of Invention

According to the present invention, even when a display housing is inverted to respond to demands for thin and lightweight structure and high design quality, its display housing is always in a proper position, which prevents a display surface of the display device from being easily injured.

BRIEF DESCRIPTION OF DRAWINGS

FIGS. 7A to 7D are diagrams showing configurations of main portions of a portable terminal according to a third exemplary embodiment of the present invention.

BEST MODE OF CARRYING OUT THE INVENTION

According to the present invention, a hinge unit is realized in which an extended line from an axial center of the shaft crosses either of two faces of the display housing that face each other.

The above axial center is configured to be aligned with a bisector of an included angle between the two faces of the display housing that faces each other.

The mobile terminal of the present invention is so configured that the display housing becomes thinner as the display housing gets apart from the hinge unit and, when a surface on a display device side is used as a front side of the display housing and, when a surface on a rear side opposite to the front side is used as a rear side of the display housing, the axial center of the inverting axis is aligned with a bisector of the included angle between the front surface and the rear of the display housing. Moreover, a pad is formed in a manner to be protruded by a predetermined height from a front surface of the operational housing and the hinge unit is provided with an opening/closing axis that orthogonally crosses the inverting axis and, when the display housing is struck to come into contact with the pad by operating the display housing so as to be opened and closed around the opening/closing axis, a clearance of a facing surface between the display housing and operational housing becomes constant.

The mobile terminal of the present invention is configured so as to be provided with an operational housing having an operational surface, a display housing having a display device, a sliding housing which slides in parallel to an operational surface of the operational housing, and a hinge unit to connect the display housing in a manner to be freely inverted relative to the sliding housing and the axial center of the inverting axis forms a predetermined angle with the display device. Moreover, the portable terminal of the present invention is configured so as to be equipped with an operational housing having an operational surface, a display housing having a display device, a rotational surface, a display housing having a display device, a rotationally moving housing to rotationally move in parallel to an operational surface of the operational surface, and a hinge unit to connect the display housing to the rotationally moving housing in a manner to be freely inverted relative to the rotationally moving housing and the axial center of its inverting axis forms a predetermined angle with the display device.

FIRST EXEMPLARY EMBODIMENT

Figure 1:
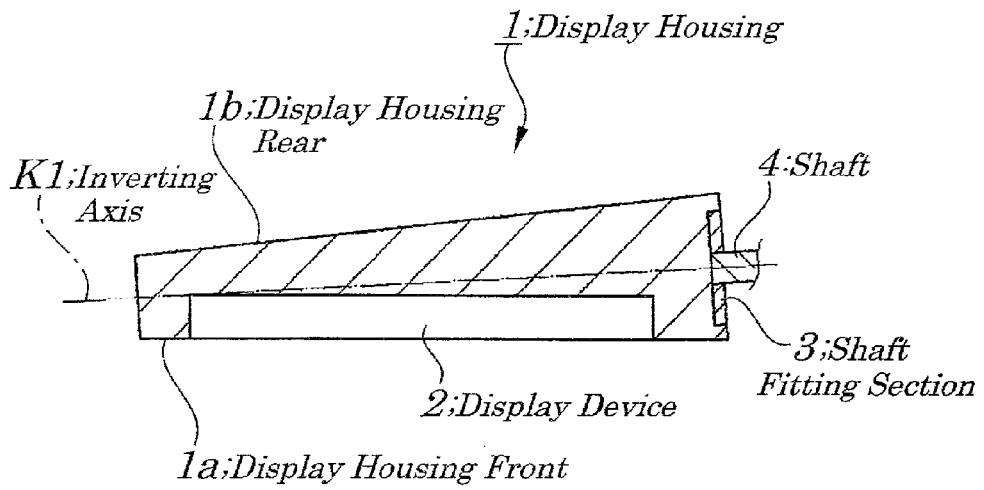
FIG. 1 is a side cross-sectional view showing a configuration of main portions of an electronic device having a hinge unit according to a first exemplary embodiment of the present invention.

FIG. 1 is a side cross-sectional view showing a configuration of main portions of an electronic device having a hinge unit according to a first exemplary embodiment of the present invention.

The electronic device of this type is a mobile phone and, as shown in FIG. 1, includes a display housing 1, a display device 2, a shaft fitting section 3, and a shaft 4. In the display housing 1, the display device 2 is mounted on a display housing front 1a. The display device 2 is made up of, for example, a liquid crystal display device or the like and performs displaying. The shaft fitting section 3 is attached to an end portion of one side of the display housing 1. The shaft 4 is inserted into the shaft fitting section 3 to support the display housing 1 in a manner to be freely inverted and an axial center of its inverting axis K1 is attached to the shaft fitting section 3 in a manner to form a predetermined angle with respect to a surface of the display device.

The hinge unit is made up of the shaft fitting section 3 and the shat 4 and is configured to connect the display housing 1 to a hinge section (not shown) mounted on an operational housing surface having, for example, an operational surface. The extended line from the axial center of the inverting axis K1 of the shaft 4 is aligned with a bisector of the including angle between two surfaces of the display housing front 1a and display housing rear 1b both being opposite to each other.

According to the electronic device, the inverting axis K1 of the shaft 4 forms a predetermined angle with the display housing front a and display housing rear 1b and, therefore, when the display housing 1 is inverted around the inverting axis K1, the posture of the display housing 1 can be changed. Accordingly, even if the display housing 1 has a shape being partially different in thickness due to demands for thin and light weight structure and for high design quality, irrespective of its rotational state, it is made possible to support the display housing 1 in an appropriate position and to avoid easy injure on a surface of the display device 2.

SECOND EXEMPLARY EMBODIMENT

Figure 2:
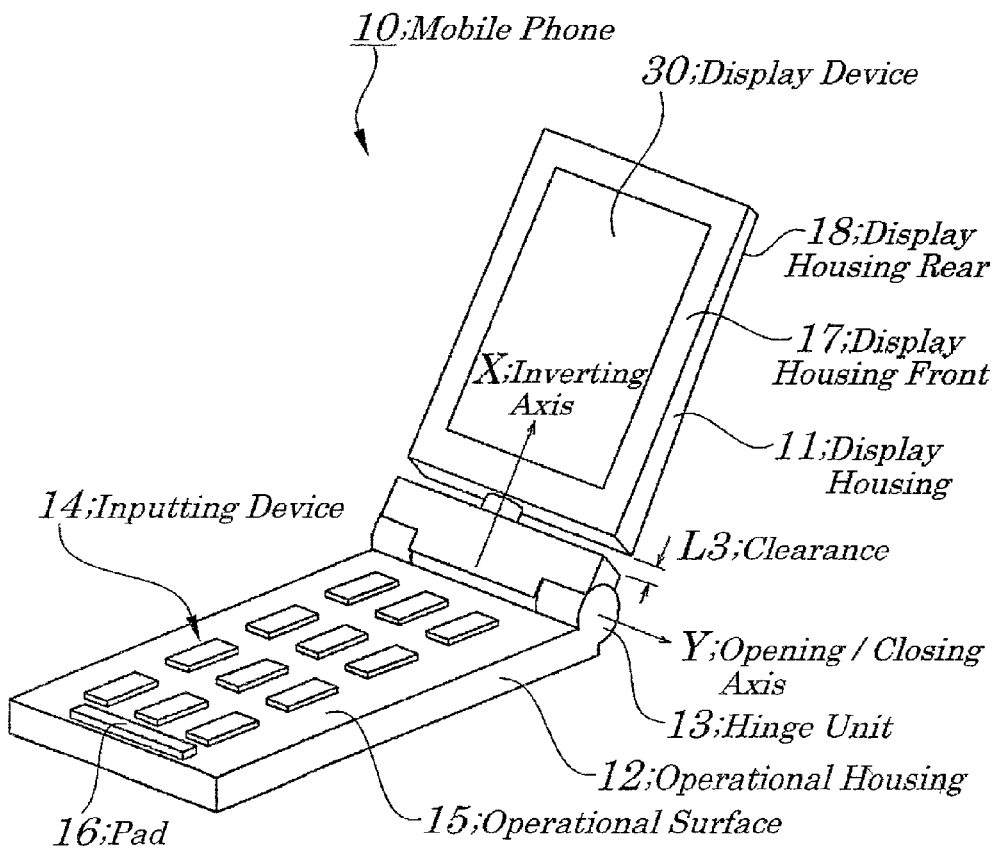
FIG. 2 is a perspective view showing a configuration of a portable terminal in an opened state of main portions according to a second exemplary embodiment of the present invention.

FIG. 2 is a perspective view showing configurations of main portions wherein the portable terminal is in a closed state according to a second exemplary embodiment of the present invention.

The portable terminal of the second exemplary embodiment is, as shown in FIG. 2, a mobile phone 10 which includes a display housing 11, an operational housing 12, and a hinge unit 13. The display housing 11 has a display device 30. The display device 30 is made up of, for example, a liquid crystal display device to perform specified displaying. The operational housing 12 has an operational surface 15 on which an inputting device 14 such as a key switch to be used for various information inputting is put in a predetermined position. The hinge unit 13 is configured to connect the display housing 11 and the operational housing 12 in a manner to be freely rotated and, according to the exemplary embodiment of the present invention, as in the case of FIG. 1, and also has a shaft (not shown) to support a shaft fitting section (not shown) mounted on one terminal region of the display housing 11 and the display housing in a manner to be freely inverted by being inserted into the shaft fitting section and to be mounted on the shaft fitting section (not shown) in a manner in which the axial center of the inverting axis X extending in a longitudinal direction of the display housing 11 forms a predetermined angle with a display surface of the display device 30.

Moreover, on the operational housing 12, a pad 16 is formed in a manner to be protruded by a predetermined height from a front surface of the operational housing 12 and the hinge unit 13 has an opening/closing axis Y along a width direction of the mobile phone 10 in a manner to be orthogonal to its front side and, when the display housing 11 is struck to come into contact with the pad 16 by opening and closing the display housing 11 around the opening and closing axis of the display housing 11, the clearance between facing surfaces of the display housing 11 and operational housing 12 keeps a certain level. That is, the hinge unit 13 is constructed as a two-axial hinge mechanism having two rotational shafts including the inverting axis X and opening/closing axis Y. By the rotation of the display housing 11 around the opening/closing axis, the mobile phone 10 is opened and closed and by the separation of the display housing 11 from the operational housing 12, the mobile phone 10 is in an opened state (opening state). Moreover, the surface of the display housing 11 forming the same surface as that of the display device 30 is called a display housing front 17 and the rear of the display housing front 17 is referred to as a display housing rear 18. There is a clearance L3 between the display housing 11 and hinge unit 13.

Figure 3:
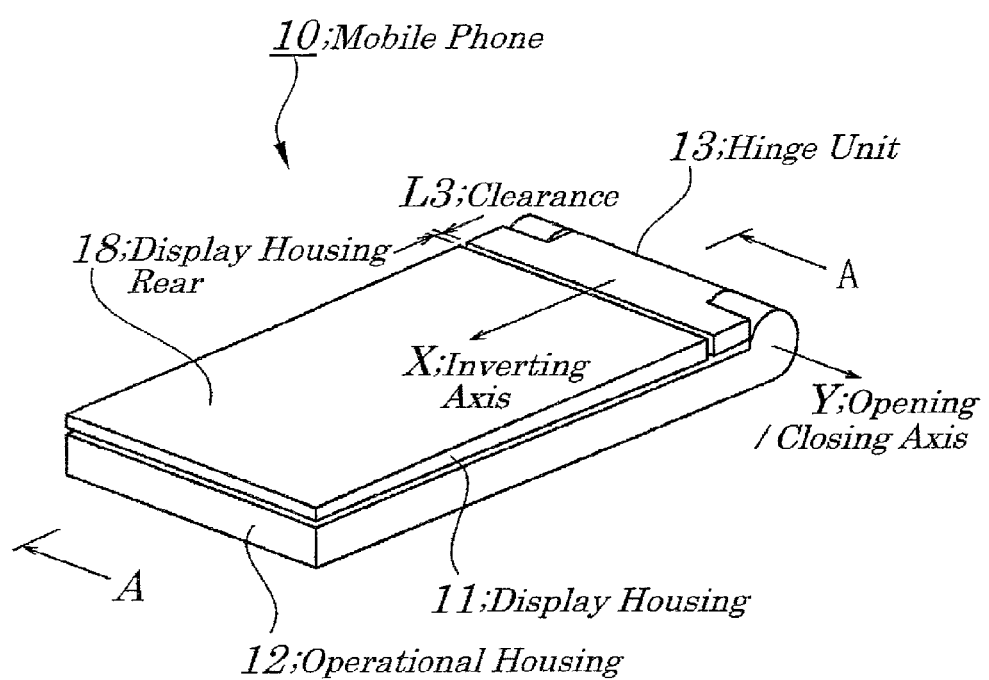
FIG. 3 is a perspective view showing configurations of main portions of a mobile phone 10 shown in FIG. 2 in a closed state.

FIG. 3 is a perspective view showing configurations of main portions when the mobile phone 10 of FIG. 2 is in a closed state. In the mobile phone 10, as shown in FIG. 3, by making the display housing 11 come near to the operational housing 12, a closed state occurs.

Figure 4A:
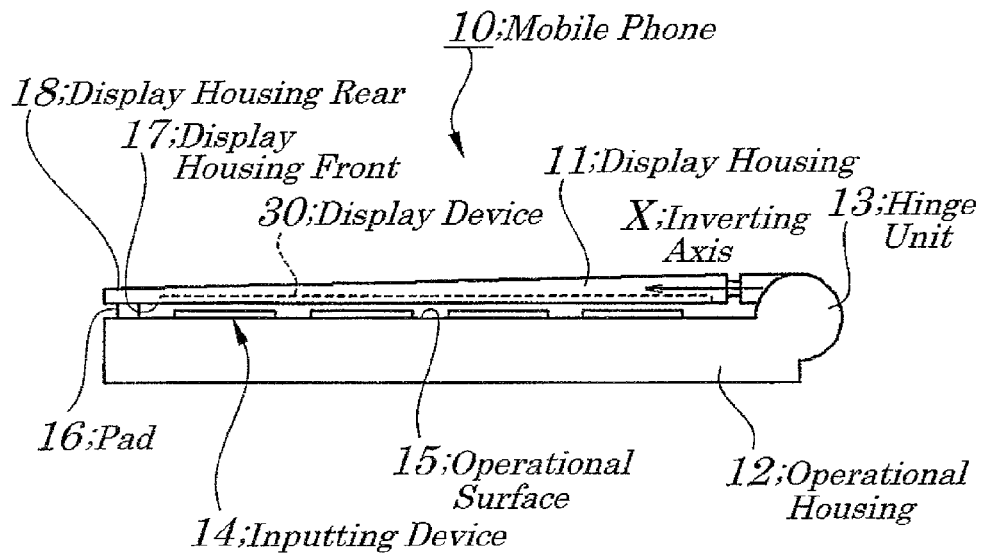
FIGS. 4A and 4B are side views showing configurations of the mobile phone 10 shown in FIG. 3.
Figure 4B:
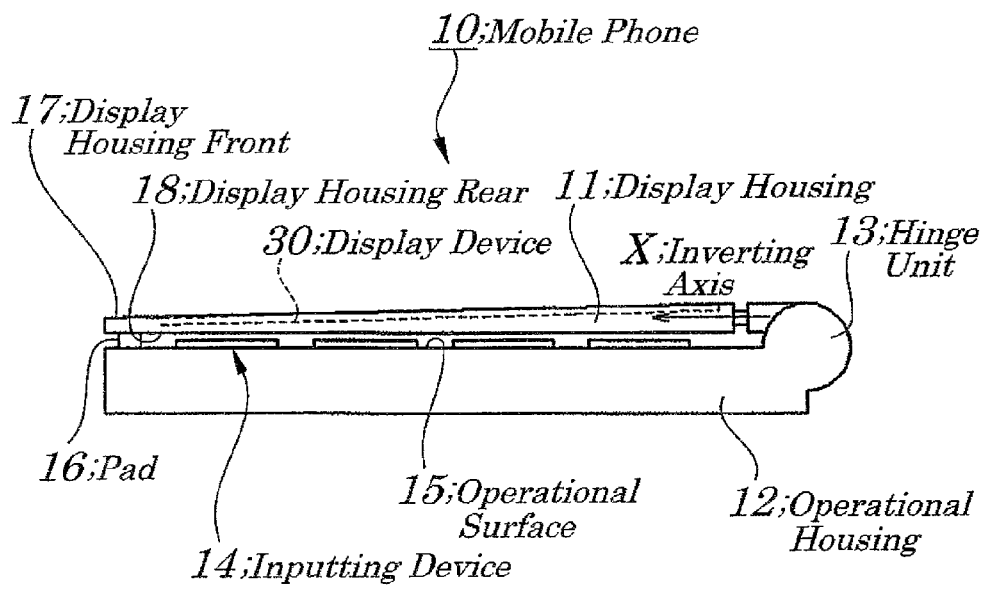

FIGS. 4A and 4B are side views showing configurations of the mobile phone 10 shown in FIG. 3, and FIG. 4A shows a state where the mobile phone 10 is closed with the display device 30 faced inward and FIG. 4B shows a state where the mobile phone 10 is closed with the display device 30 faced outward.

In the mobile phone 10, by rotationally moving the display housing 11 around the inverting axis X, when the mobile phone 10 is closed, as shown in FIG. 4A, the display housing front 17 comes close to the operational surface 15 (display inward state) and, as shown in FIG. 4B, the display housing rear 18 comes close to the operational surface 15 (display outward state). Inside of the operational housing 12, electronic devices necessary for transmittance and receiving of various kinds of information are arranged and, on the operational surface 15, the inputting device 14 such as a key switch to be used for inputting various kinds of information is mounted. Moreover, the pad 16 is mounted on an end portion (on a terminal most far from the hinge unit) of the operational surface 15 in the operational housing 12. The pad 16 is made of an elastic material such as a resin and rubber and, when the mobile phone 10 is closed, the display housing 11 is struck to come into contact with the pad 16, which enables a specified clearance to be surely kept between the display housing front 17 and operational surface 15, or between the display housing rear 18 and the operational surface 15.

Figure 5:
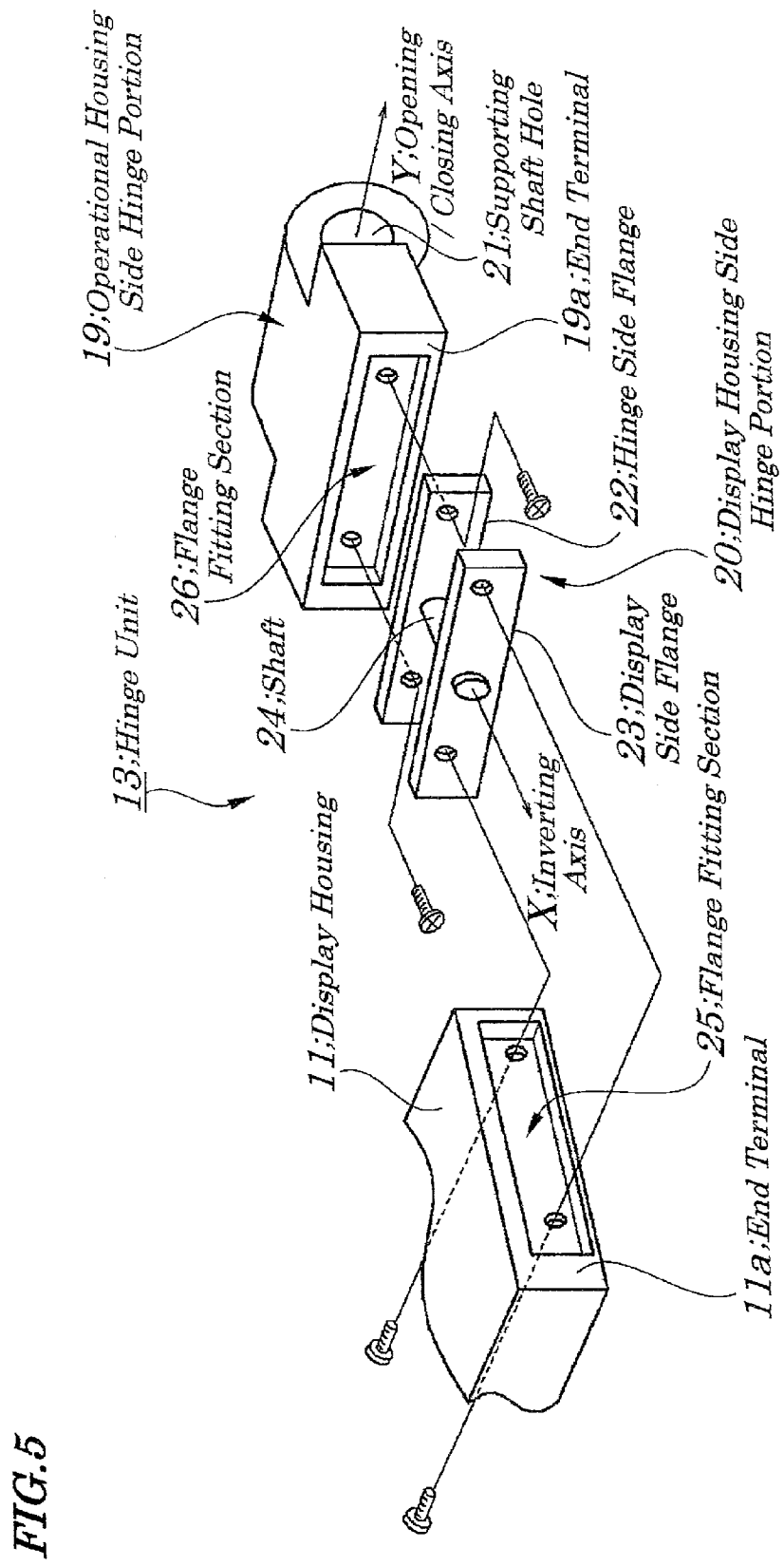
FIG. 5 is a diagram showing a configuration of the hinge unit 13 shown in FIG. 2.

FIG. 5 is a diagram showing a configuration of the hinge unit 13 shown in FIG. 2. In the hinge unit 13, as shown in FIG. 5, at one end terminal, an operational housing side hinge portion 19 is mounted and, at the other end terminal, a display housing side hinge portion 20 is mounted. The operational housing side hinge portion 19 has a supporting shaft hole 21 to support the hinge unit 13 in a manner to rotationally move around an opening/closing axis Y relative to the operational housing 12. The display housing side hinge portion 20 includes a hinge side flange 22, a display side flange 23, and a shaft 24. The hinge side flange 22 is secured to the operational housing side hinge portion 19 with screws or the like. The display side flange 23 is secured with screws or the like.

The shaft is configured to support the display side flange 23 in a manner to be rotationally moved with respect to the hinge side flange 22. At least the fitting surface of the hinge side flange 22 is mounted so as to be orthogonal to the axis of the shaft 24. At the end terminal of the display housing 11, a flange fitting section 25 into which the display side flange 23 is inserted is mounted. On the other hand, at the end terminal 19a of the operational housing side hinge portion, the flange fitting section 26 into which the hinge side flange 22 is inserted is mounted. The display side flange 23 is attached to the flange fitting section 25 and the hinge side flange 22 is attached to the flange fitting section 26. This enables the display side flange 23 to be rotationally moved with respect to the hinge side flange 22.

Figure 6A:
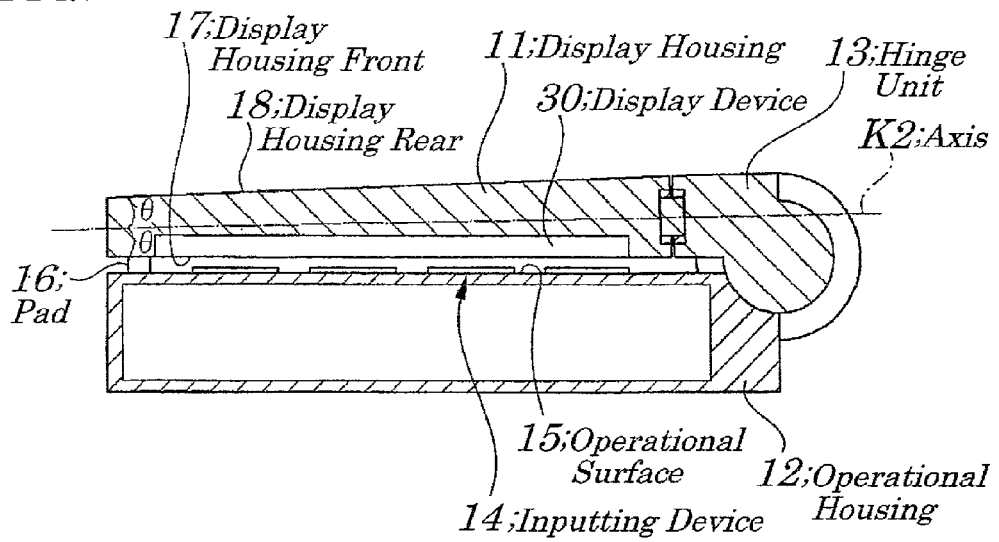
FIGS. 6A and 6B are cross-sectional views for showing configurations of the mobile phone 10 taken along the line A-A shown in FIG. 3.
Figure 6B:
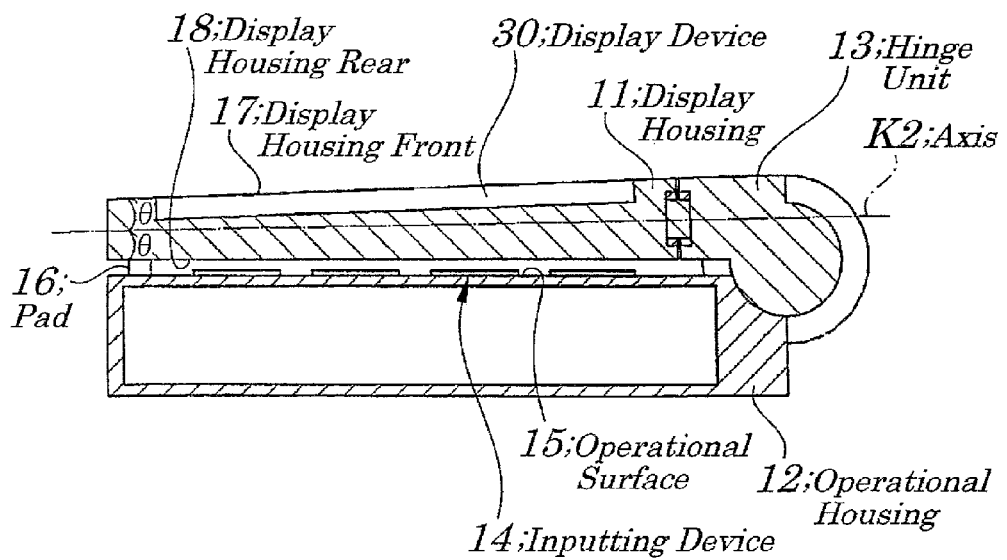

FIGS. 6A and 6B are cross-sectional views for showing configurations of the mobile phone 10 taken along the line A-A shown in FIG. 3, and FIG. 6A is a diagram showing a display inward directing state and FIG. 6B is a diagram showing a display outward directing state. As shown in FIG. 6A, the mobile phone 10 of the present invention is so configured that the display housing becomes thinner as the display housing gets apart from the hinge unit and, when a surface on the display device 30 side is used as the display housing front 17 and a surface on a rear to the display housing front 17 is used as a display housing rear 18 and, the axial center of the inverting axis is aligned with a bisector of the included angle between the front surface and the rear of the display housing.

When the included angle between the display housing front 17 and the display housing rear 18 is set to be $2\theta$, an axis K2 (inverting axis) of the shaft 24 is at an angle $\theta$ with respect to each of the display housing front 17 and the display housing rear 18. That is, the axis K2 of the shaft 24 is aligned with a bisector of the included angle formed between the display housing front 17 and display housing rear 18. In other words, the axis K2 of the shaft 24 forms an angle with each of the display housing front 17 and display housing rear 18.

In the mobile phone 10, by putting the axis K2 of the shaft 24 on the bisector of the included angle between the display housing front 17 and display housing rear 18, when the display housing 11 is rotationally moved around the inverting axis X to cause the state in FIG. 6A or the state in FIG. 6B to occur, the clearance between the display housing 11 and the operational housing 12 remains unchanged. Moreover, the end terminal 11a of the display housing 11 in which the flange fitting section 25 is mounted and the end terminal 19a of the operational housing side hinge portion 19 in which the flange fitting section 26 is mounted are implemented in parallel to each other and the axis of the shaft 24 is vertical to the end terminal 11a and 19a. Therefore, even when the display housing 11 is rotationally moved around the inverting axis X, the clearance between the end terminal 11a of the display housing 11 and the end terminal 19a of the operational housing side hinge portion 19 (that is, the clearance L3 in FIGS. 2 and 3) remains unchanged. This enables the clearance between the display housing 11 and the operational housing 12 is kept always constant while demands for thin and light weight structure and for high design quality are being satisfied.

THIRD EXEMPLARY EMBODIMENT

FIGS. 7A to 7D are diagrams showing configurations of main portions of a portable terminal according to a third exemplary embodiment of the present invention. FIG. 7A is a perspective view showing a state before the sliding housing is slid and FIG. 7B is a side diagram showing a state after the sliding housing has been slid. FIG. 7C is a perspective view showing a state after the display housing has been rotationally moved and FIG. 7D is a side diagram showing a state after the display housing has been inverted.

The portable terminal of the third exemplary embodiment, as shown in FIG. 7A is a mobile phone 10B including an operational housing 31, a sliding housing 32, a display housing 33, and a hinge unit 35.

The operational housing 31 has an operational surface on which inputting devices such as a key switch (not shown) are arranged in a predetermined position. The sliding housing 32 is slid in a direction D1 being parallel to an operational surface of the operational housing 31.

The display housing 33 is equipped with a display device 36 such as a liquid crystal display device and a surface that faces a surface on which the display device 36 is mounted is used as a display housing front 33a and a surface on which the display device 36 is mounted is used as a display housing rear 33b. The hinge unit 35 has the shaft (not shown) being similar to the shaft 24 shown in FIG. 5 and the extending line of the axial center of the shaft is set so as to cross either of two surfaces that face the display housing 33 (for example, a display surface of the display device 36). By configuring as above, the hinge unit 35b connects the display housing 33 to the sliding housing 32 in a manner to be freely inverted and the axial center of the inverting axis forms a predetermined angle with a display surface of the display device.

The sliding housing 32, as shown in FIG. 7B, is slid in parallel to an operational surface of the operational housing 31 through, for example, a rail-shaped sliding unit 34. In this case, on the operational housing 31 side, a guide is provided and, on the sliding housing 32 side, a leg portion is provided which is guided by the guide. An axis K3 of the shaft of the hinge unit 35 is attached so as to have an angle with respect to each of the display housing front 33a and display housing rear 33b so that the extending line of the axial center of the shaft crosses the display housing front 33a.

In the mobile phone 10B, for use, the sliding housing 32 is slid to the direction D1 and, as shown in FIG. 7C, the display housing 33 is rotationally moved to the direction D2. As shown in FIG. 7D, the display housing 33 is rotationally moved by 180 degrees from the state shown in FIG. 7B. Since the axis K3 of the shaft of the hinge unit 35 is attached so as to have an angle with each of the display housing front 33a and the display housing rear 33b, as the display housing 33 is rotationally moved, the display housing 33 gets up and the display housing 33 has an angle being smaller than 180 degrees with respect to the sliding housing 32. Thus, during the use, the display housing 33 gets up, which improves visibility of a screen and design quality.

FOURTH EXEMPLARY EMBODIMENT

Figure 8A:
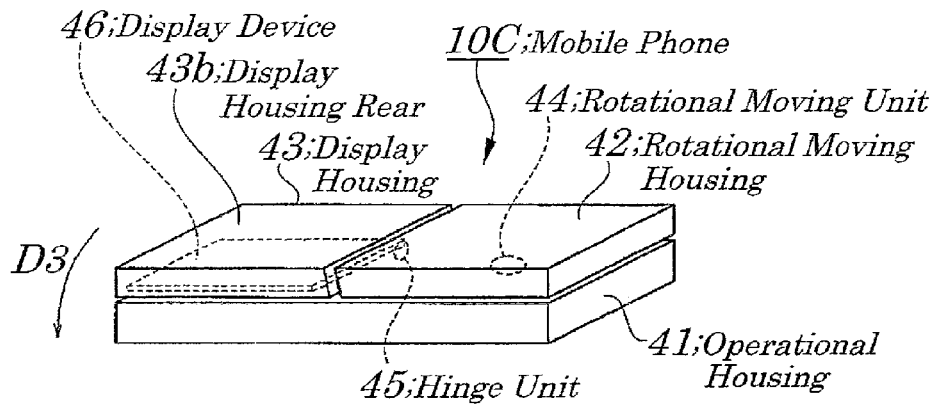
FIGS. 8A to 8D are diagrams showing configurations of main portions of a portable terminal of a fourth exemplary embodiment of the present invention.
Figure 8B:
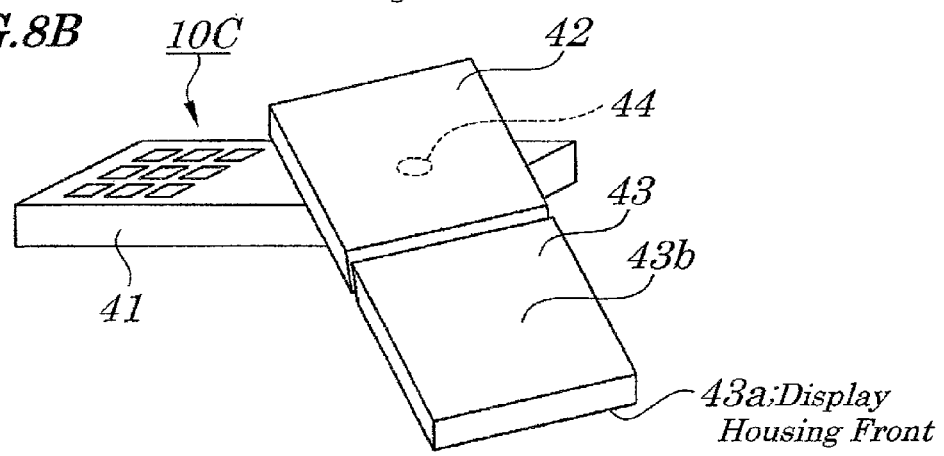
Figure 8C:
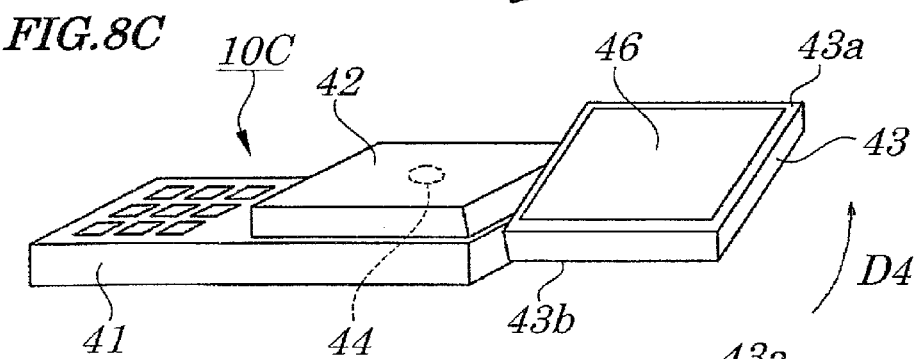
Figure 8D:
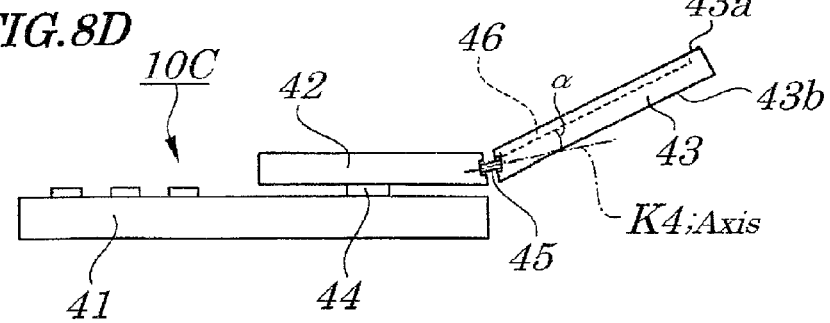
Figure 9A:
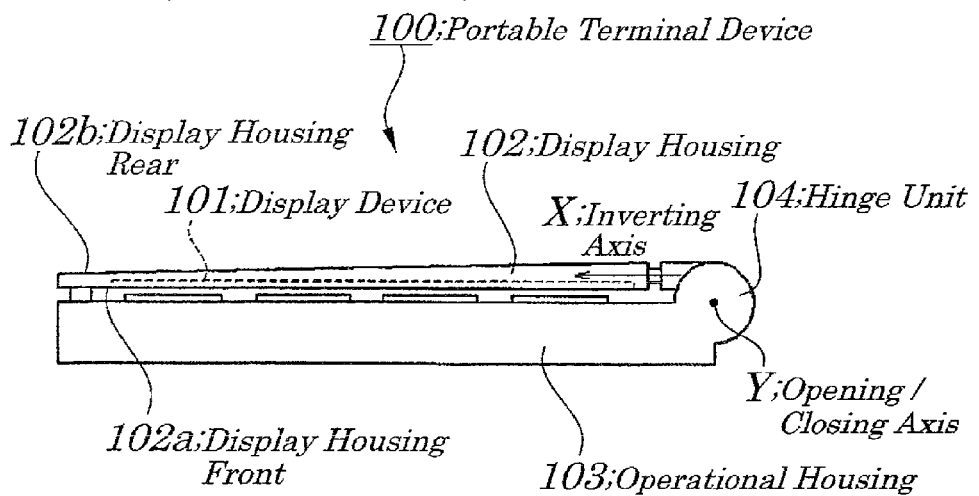
FIGS. 9A and 9B are side views showing configurations of the portable terminal in a related art.
Figure 9B:
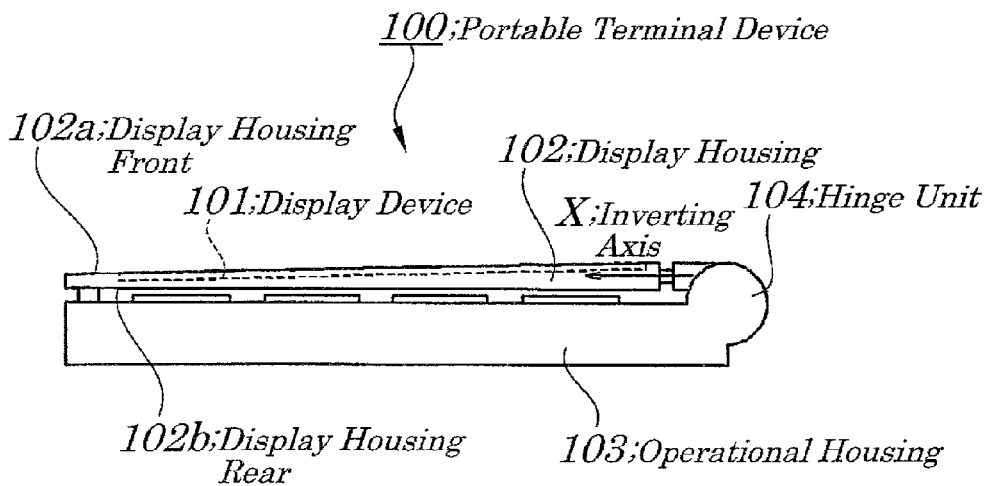

FIGS. 8A to 8D are diagrams showing configurations of main portions of a portable terminal of a fourth exemplary embodiment of the present invention. FIG. 8A is a perspective view showing a state before the rotationally moving housing is rotationally moved and FIG. 8B is a side view showing a state after the rotationally moving housing has been rotationally moved and FIG. 8C is a perspective view showing a state after the rotationally moving housing has been rotationally moved and FIG. 8D is a side view showing a state after the display housing has been inverted. The portable terminal of the fourth exemplary embodiment, as shown in FIG. 8A, is a mobile phone 10C and includes an operational housing 41, a rotationally moving housing 42, a display housing 43, and a hinge unit 45. The operational housing 41 has an operational surface on which an inputting device (not shown) such as a key switch is placed in a predetermined position.

The rotationally moving housing 42 is configured to be connected to the operational housing 41 through the rotational moving unit 44 and is rotationally moved in a direction D3 parallel to an operational surface of the operational housing 41. The display housing 43 has a display device 46 such as a liquid crystal display device. The hinge unit 45 has a shaft (not shown) similar to the shaft 24 in FIG. 5 and the extending line of the axial center of the shaft is mounted so as to cross either of the two surfaces that face the display housing (for example, a surface facing a face on which the display device 46 is mounted). By configuring as above, the hinge unit 45 connects the display housing 43 to the rotationally moving housing 42 in a manner to be freely inverted and the axial center of the inverting axis forms a predetermined angle with a display surface of the display device 46.

In the mobile phone 10C, during the use, as shown in FIG. 8A, the rotationally moving housing 42 is rotationally moved in the direction D3 and, as shown in FIG. 8B, the display housing 43 is located far from the operational housing 41. Here, the surface on which the display device 46 of the rotationally moving housing 42 is the display housing front 43a and the surface which faces the display housing front 43a is the display housing rear 43b. After that, as shown in FIG. 8C, the display housing 43 is rotationally moved to the direction D4. As shown in FIG. 8D, the display housing 43 is rotationally moved by 180 degrees from the state in FIG. 8C. Since an axis K4 of the shaft of the hinge unit 45 is attached so as to have an angle with respect to the display housing rear 43b, as the display housing 43 is rotationally moved, the display housing 43 gets up and the display housing 43 has an angle being smaller than 180 degrees with respect to the rotationally moving housing 42. Thus, during the use, the display housing 43 gets up, which improves visibility of a screen and design quality.

It is apparent that the present invention is not limited to the above embodiments but may be changed and modified without departing from the scope and spirit of the invention.

INDUSTRIAL APPLICABILITY

The present invention can be applied not only to mobile phones but also to a general mobile in which the display portion side unit and other units are connected through a two-axis hinge mechanism.

EXPLANATION OF LETTERS AND NUMERALS 1, 11, 33, 43; Display housing,
1a, 17, 33a, 43a; Display housing front,
1b, 18, 33b, 43b; Display housing rear,
2, 30, 36, 46; Display device,
3; Shaft fitting section,
4, 24; Shaft,
10, 10b, 10c; Mobile phone,
12, 31, 41; Operational housing,
13, 35, 45; Hinge unit,
15; Operational surface,
16; Pad,
32; Sliding housing,
34; Sliding unit,
42; Rotationally moving housing,
44; Rotational moving unit

What is claimed is:
1. A portable terminal comprising:
a display housing with a display device;
an operational housing with an operational surface; and a hinge unit to connect said display housing and said operational housing, wherein said hinge unit has a shaft fitting section to be fitted to an end terminal region of one side of a display housing having a display device and a shaft inserted into said shaft fitting section to support said display housing in a manner to be freely inverted about an inverting axis and fitted to the shaft fitting section so that an axial center of said inverting axis forms a predetermined angle with a display surface of said display device, wherein a pad is formed in a manner to be protruded by a predetermined height from a front surface of said operational housing, and wherein said hinge unit has an opening/closing axis orthogonal to said inverting axis and, when said display housing is struck to come into contact with said pad by operating said display housing so as to be opened and closed around said opening and closing axis, a clearance of a facing surface between said display housing and said operational housing is kept constant.

2. The portable terminal according to claim 1, wherein said display housing becomes thinner as said display housing gets apart from said display housing and, when a surface on a display device side is used as a front side of said display housing and, when a surface on a rear side opposite to the front side is used as a rear side of said display housing, said an axial center of said inverting axis is aligned with a bisector of said included angle between a front surface and a rear of said display housing.

* * * * *